United States Patent [19]

Feilchenfeld

[11] 4,357,596
[45] Nov. 2, 1982

[54] MULTI-LINE SCAN MARK VERIFICATION CIRCUIT

[75] Inventor: Michal M. Feilchenfeld, Penn Hills, Pa.

[73] Assignee: Westinghouse Electric Corp., Pittsburgh, Pa.

[21] Appl. No.: 154,742

[22] Filed: May 30, 1980

[51] Int. Cl.³ .............................................. G06K 7/14
[52] U.S. Cl. .............................. 340/146.3 Z; 235/436; 235/456
[58] Field of Search ................. 340/146.3 A, 146.3 H, 340/146.3 Z, 146.3 AH, 146.3 AG; 235/435, 436, 454, 456, 470, 471, 474, 494; 250/566, 568, 569, 555

[56] References Cited

U.S. PATENT DOCUMENTS

| | | | |
|---|---|---|---|
| 3,463,906 | 8/1969 | Chiang | 235/436 |
| 3,528,059 | 9/1970 | Spanjersberg | 235/456 |
| 3,578,953 | 5/1971 | Milford | 340/146.3 Z |
| 3,643,069 | 2/1972 | Kikuchi | 340/146.3 Z |
| 3,810,094 | 5/1974 | Mori et al. | 340/146.3 AH |
| 3,852,573 | 12/1974 | Dolch | 235/456 |
| 3,852,715 | 12/1974 | Morimoto | 340/146.3 Z |
| 4,009,467 | 2/1977 | Kodera et al. | 340/146.3 AH |
| 4,298,859 | 11/1981 | Feilchenfeld | 340/146.3 Z |
| 4,300,123 | 11/1981 | McMillin et al. | 340/146.3 Z |

FOREIGN PATENT DOCUMENTS

| | | | |
|---|---|---|---|
| 54-932 | 1/1979 | Japan | 340/146.3 Z |
| 1371493 | 10/1974 | United Kingdom | 340/146.3 Z |

*Primary Examiner*—Leo H. Boudreau
*Attorney, Agent, or Firm*—M. P. Lynch

[57] ABSTRACT

In a document scanning scheme where data is preceded on the document by a preprinted document scan mark, circuitry is employed to utilize multiple line scans of the scan mark by a line scan camera to verify the presence of a scan mark and avoid erroneous response to random marks on the document.

3 Claims, 8 Drawing Figures

MULTI-LINE SCAN MARK VERIFICATION CIRCUIT

BACKGROUND OF THE INVENTION

Optical mark and optical character readers, which employ line scan cameras having an array of photosensitive elements, develop analog output signals on a line by line basis of a scanned document which provide an indication of the presence or absence of characters or marks on the basis of light reflective from or transmission through the document.

The black/white signature of a scan line, or sweep of a line scan camera, across a document, such as a student's test answer sheet, a voting ballot, an order entry form, etc., produces an analog video output signal from the camera. The analog signal is typically applied to a video normalizer circuit to initially provide a black level compensation and determine the gray level of the discrete picture elements (pixel) of the discrete portion of the analog signal corresponding to the individual photosensitive elements of the line scan camera. The gray level analog output signals are supplied to an analog to digital converter which generates a two bit output identifying the gray level of each picture element to determine if the gray level corresponds to an accepted valid mark or character on the document, or is indicative of an erroneous mark. This multi-level mark, or character, density discrimination provided by the two bit output of the analog to digital converter permits electronic differentiation between an inadvertent pencil mark and a legitimate mark or character appearing on the document.

The utilization of a line scan camera and digital signal processing circuitry for deriving intelligence from a document is described in detail in pending U.S. patent application Ser. No. 457, filed Jan. 2, 1979, entitled, "Optical Reading System" by J. V. McMillin and D. W. Schroeder, now U.S. Pat. No. 4,300,123, which is assigned to the assignee of the present invention and incorporated herein by reference.

In order for the typical state of the art system to operate effectively, the system recognizes marks appearing in data entry mark locations only when the marks are preceded by a special printed document mark called a scan mark. Scan marks are used for document verification and registration.

Typically, a single scan line of the line scan camera is employed to verify the presence of a scan mark and thus alert the signal processing circuitry to the data or character information to follow from subsequent scan lines of the document. A single scan line verification of the presence of a scan mark, however, renders the system vulnerable to false verification due to the presence of erroneous marks on the document. Inasmuch as the application of the optical scanning system often involves sensitive and important information such as student tests, census information, voter ballots, it is important to minimize erroneous responses such as the false verification of a document scan mark.

There is disclosed herein with reference to the accompanying drawings a unique multi-line scan mark verification technique.

SUMMARY OF THE INVENTION

There is disclosed herein with reference to the accompanying drawings a logic circuit arrangement which, after the first line verification of the scan mark presence, inhibits the signal processing of data information for a predetermined number of lines in order to confirm the genuineness of the detected scan mark. During this period the presence of the scan mark on consecutive lines is detected and its number counted. When the preset number of counts on consecutive lines is detected, the genuineness of the scan mark is confirmed and the inhibit condition is removed from the signal processing circuitry.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
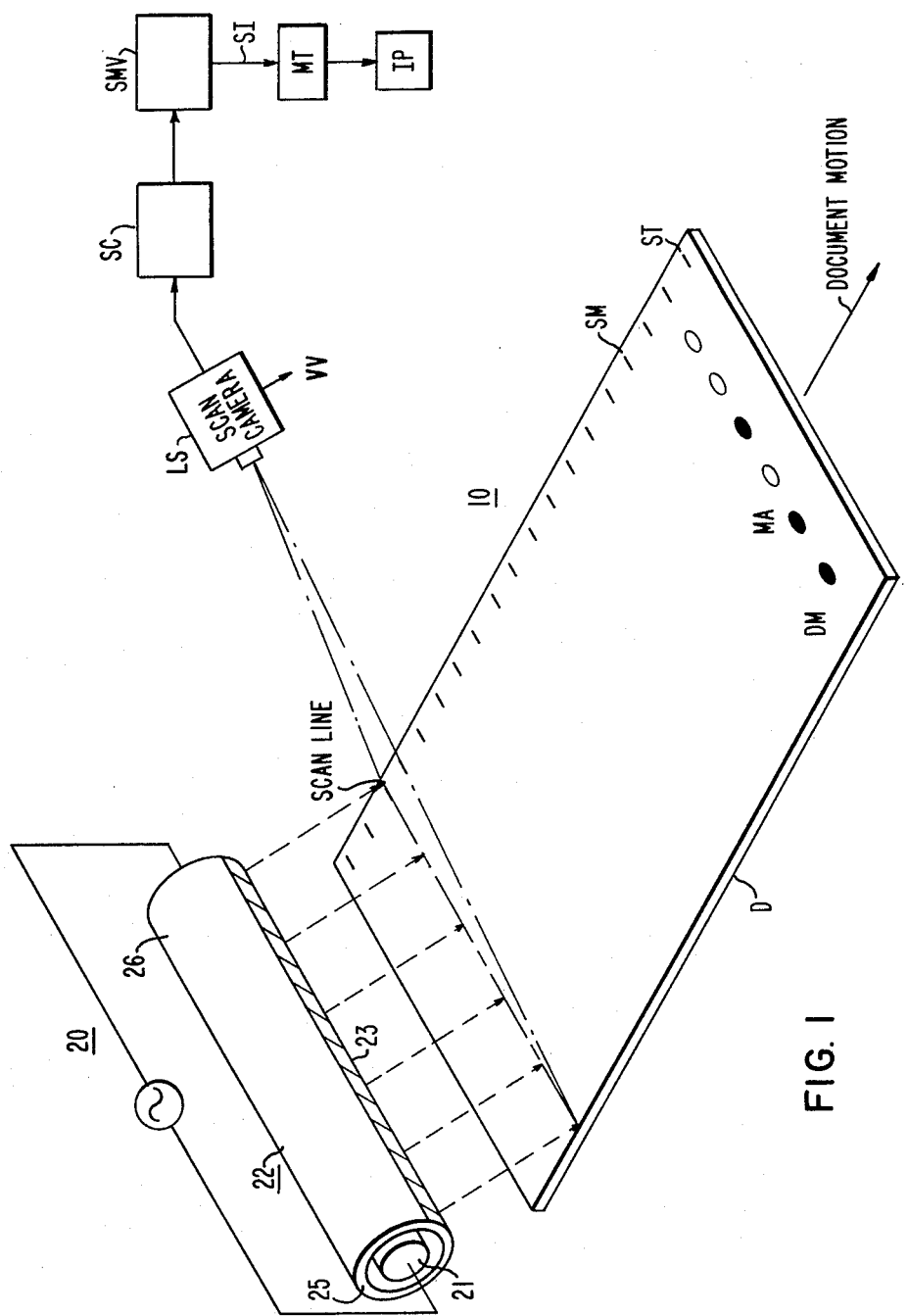
FIG. 1 is a block diagram schematic illustration of a document scanning system employing the invention.

Referring to FIG. 1, there is illustrated an optical reading system employing a line scan camera LS which scans the moving document D which is illuminated by the line light source L. The line scan camera LS can be suitably implemented through the use of commercially available line scan camera systems such as the Fairchild Model CCD1300 which includes a 1024 element charge coupled device as the video signal source. The 1024 element charge coupled device module of the line camera LS senses the optical information pattern corresponding to the illuminated line of the moving document D and produces an analog waveform which is proportional to the brightness of the image of the data or information present on the illuminated scan line of the document D. The use of a 1024 element charge coupled line array of photosensitive devices as a video pick up provides a high resolution readout of 100 picture elements (pixels) per inch. The document D exhibits a document format having a vertical scan track area ST of scan marks SM and a pattern of data entry mark areas MA, as in a test scoring answer sheet, suitable for accepting a data mark DM typically produced by filling in a mark area MA with a graphite pencil.

Under the operation of the line scan camera LS, each mark area MA consists of a plurality of scan points or picture elements, i.e., pixels, as defined by the photosensitive elements of the camera LS. The motion of the document D in the vertical direction exposes successive lines of the document to the line scanning camera LS. Thus, the horizontal sweeping of the camera across the width of the document D coupled with the vertical movement of the document D perpendicular to the camera sweep line generates the equivalent of a rasterscanning capability such as that present in CRT displays. Typically, the shift frequency of the line scan camera LS is 5 MHz.

The optical information derived from each pixel, or scan point, by the line scanning camera LS is transmitted as an analog signal to the signal conditioning circuit SC. The signal conditioning circuit SC functions to convert each analog signal representing a pixel into a two-bit digital signal which establishes four levels of gray scale for each pixel. If additional gray scale resolution is required, a digital signal of more than two bits can be generated.

In addition to developing a multi-bit digital output signal, the circuit SC employs a comparator circuit for detecting the presence of a scan mark SM and generating a scan mark detection signal CB.

While numerous line light source systems are available for concentrating line illumination on the document D, one such line light source is described in issued U.S. Pat. No. 4,186,431, entitled "Improved Linear Light Source" which is assigned to the assignee of the present invention and incorporated herein by reference.

The activation of the mark totalizer circuit MT and the signal processing circuitry in general is controlled by a scan interval SI from the scan mark verification circuit SMV which verifies the presence of a valid scan mark SM.

The mark area totalizer MT sums the "weights" of the individual pixels of the mark areas MA and stores the sum for each mark area MA in memory. This is described in the above-referenced pending application. At the conclusion of the scanning operation of each row scan of the document D, the totalized digital counts of the respective marked areas MA of the row scan, as stored in the marked area totalizer MT, are transmitted as data information for processing by the information processor IP, which may typically be a general purpose host computer.

Figure 6:
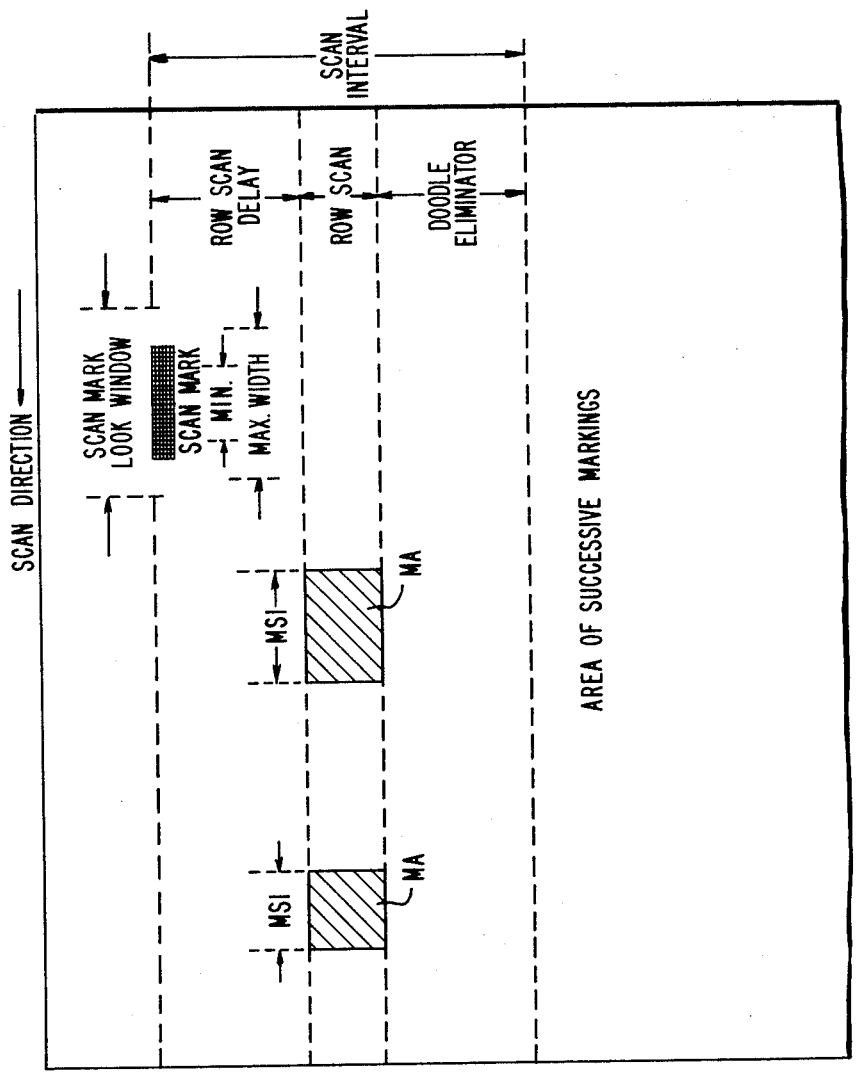
FIG. 6 is an illustration of a document format consisting of scan marks and data marks wherein the data marks are used for the entry of information.

On each preprinted document there are located scan marks SM, one or more of which may be positioned prior to the first rows of mark areas MA as illustrated in the typical document format of FIG. 6. The verification of the presence of the scan mark SM alerts and enables the circuitry, such as the mark totalizer circuit MT, to ready such circuitry for the data information to be derived from subsequent line scans of the mark areas MA of a row scan.

For the purpose of clarification, the following terms are defined with respect to the conventional scanning of a document such as that illustrated in FIG. 6.

Scan Mark—A printed mark which always accompanies one or more mark areas MA. For any given preprinted document the approximate length and position of the scan mark is known.

Scan Track—A vertical array of Scan Marks.

Scan Mark Look Window (SMLW)—A horizontal timing signal encompassing the Scan Mark, and measured in terms of pixels.

Scan Interval (SI)—A vertical timing signal, measured in terms of camera scan lines, and generated in response to the presence of a Scan Mark of appropriate duration and appearing within a prescribed time boundary. The Scan Interval start immediately on the same scan line following the detection of a valid Scan Mark. Its total duration is equal to the sum of the Row Scan Delay, Row Scan Length, and Doodle Eliminator Duration.

Row Scan Delay—The delay in terms of scan lines corresponding to the number of lines separating the Scan Mark and the line corresponding the leading edge of the Row Scan.

Row Scan-The time interval expressed in the number of scan lines in which the mark areas are located.

Doodle Eliminator—The time interval expressed in the number of scan lines extending from the trailing edge of the Row Scan to the trailing edge of the Scan Interval. This time interval forms a protective region over which any "doodling" that may be associated with genuine Scan Marks will be ignored.

Video Valid (VV)—A logic signal developed by the line scan camera LS indicating the presence of valid video information.

The various techniques for achieving scan mark detection and verification will be generally described with reference to FIG. 2A. A memory means 10, which may typically be a programmable read only memory or a representative portion of a system host computer, as described in the above-referenced copending application, and further employed in U.S. Pat. No. 4,153,895, entitled "Mark Sense Reader", issued May 8, 1979, is used to store data including scan mark parameters, mark area vertical parameters, and mark area horizontal parameters. The scan mark parameters define the position and duration of the Scan Mark Look Window (SMLW) of FIG. 6 for a predetermined document format and also determine the maximum and minimum duration of the scan mark SM. The mark area vertical parameters determine the row scan delay, the row scan duration, and the doodle eliminator duration of FIG. 6. The mark area horizontal parameter MSI of FIG. 6 deals with the horizontal locations and horizontal dimensions of the mark areas MA, defining their pattern along the scan line of the line scan system camera. The stored data of the memory 10 is provided as input information to a scan mark look window generator 12 and a scan mark width detector 14, the implementation of which is typically illustrated in FIG. 2B using commercially available components.

The scan mark look window generator 12 is depicted as consisting of three downcounters DC (74LS169A) which are preloaded from the memory 10 and gate circuits GC (74S00) with the scan mark look window signal SMLW being the output of a J-K flip-flop circuit FF (74LS112). The scan mark width detector circuit 14 includes four downcounters DC' (74LS169A) preloaded from the memory 10, input gate circuits GC1 and GC2 (74S10) and an output gate circuit GC3 (74S260) which serves as an input to AND gates 16 and 26.

Figure 3B:
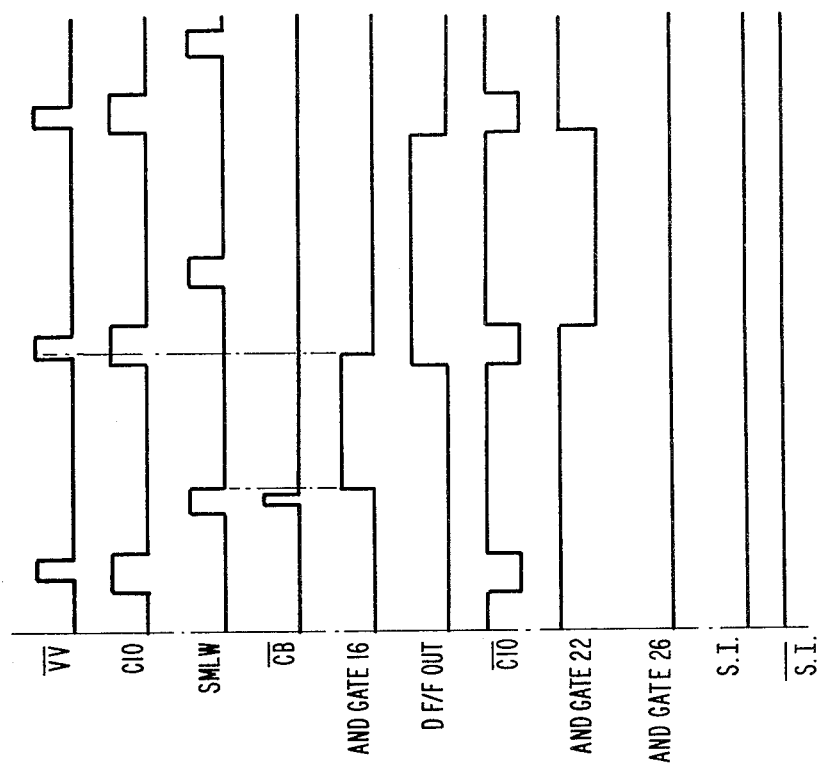
FIGS. 3A and 3B are timing diagrams for the operation of the scan mark verification circuit of FIG. 2.
Figure 3A:
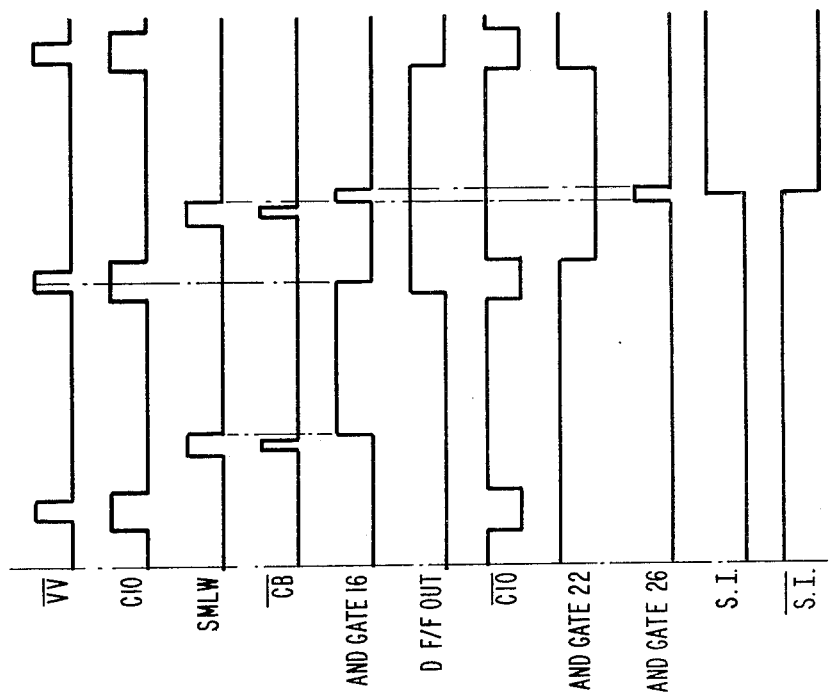

The scan mark look window generator 12 responds to scan mark look window information from memory 10 by transmitting a scan mark look window signal SMLW to enable the scan mark width detector 14 causing the detector 14 to compare the scan mark signal CB from the signal conditioning circuit SC with the scan mark parameters received from the memory 10. The trailing edge ELW of the scan mark look window signal SMLW, as shown in the timing diagrams of FIGS. 3A and 3B, provides the overall timing of the scan mark verification circuit SMV by serving as inputs to logic AND gates 16 and 26. FIG. 3A corresponds to two consecutive scan marks while FIG. 3B is that of a single scan mark. The output of AND gate 26 causes the scan interval generator 30 to generate a scan interval signal SI which enables the system signal processing circuitry following verification of a valid scan mark by the scan mark verification circuit SMV. Once a scan interval has been initiated by the scan interval signal SI from the scan interval generator 30, further scan mark verification is inhibited by applying a disabling signal SI to the scan mark look window generator 12 and the logic AND gates 16 and 26.

When a first line scan mark width and position have been verified by the scan mark width detector 14 and a corresponding verification logic signal supplied as inputs to the logic AND gates 16 and 26, the AND gate 16 responds to the presence of logic inputs from the scan mark look window generator 12 and the scan mark width detector 14 by initiating a logic output. The logic output of AND gate 16 is supplied as an input to the D-type flip-flop circuit 18. The logic signal from AND gate 16 extends from the leading edge of the signal ELW to the time when the scan mark look window generator 12 and the scan mark width detector 14 are reloaded from the memory 10. This occurs within the down time defined by the video valid signal VV generated by the camera LS indicating the presence of video information. The verification circuit SMV clocks the presence of the first line scan mark verification via the signal C10 which is supplied to the flip-flop circuit 18 from the pixel counter 20. The output of the flip-flop circuit 18 is inhibited in AND gate 22, however, by the complement signal $\overline{C10}$ for the duration of the down time in order to avoid a premature activation of the scan interval generator 30 caused by the trailing edge signal ELW during the down time. The duration of the signal $\overline{C10}$ is fixed, and as shown in FIG. 3 encompasses the valid video signal VV. When the inhibit signal $\overline{C10}$ is removed, the leading edge of the next ELW signal controls the timing of the logic AND gate 26 resulting in a logic output from the AND gate 26 to the input of the scan interval generator 30. This results in a scan interval signal SI being generated and applied to the system signal processing circuitry acknowledging the presence of a valid scan mark. At the same time, the scan interval signal $\overline{SI}$ disables the scan mark look window generator 12 and the logic AND gates 16 and 26.

A typical implementation of the pixel counter 20 is illustrated as consisting of a twelve bit comprised of three counters C (74LS161) and an input gating circuit G (74LS74A). The clock input is from the system's 5 MHz source while the gate input is the video valid signal VV from the camera LS. The pixel count is controlled by the occurrence of the video valid signal VV and is not influenced by the position of the document. The output signals C10 and $\overline{C10}$ are binary multiples of the pixel count.

Figure 2A:
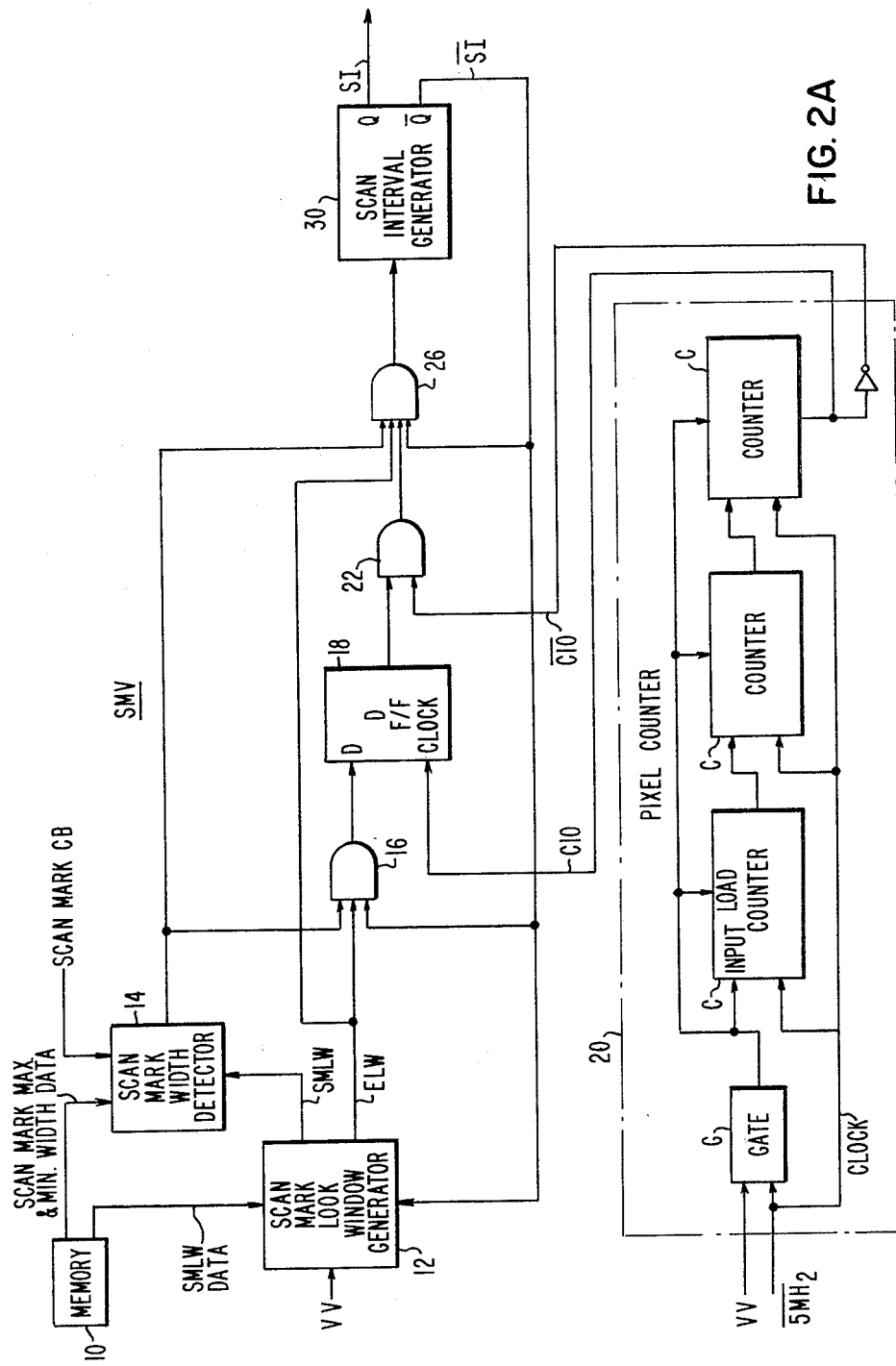
FIG. 2 is a schematic illustration of a typical two line scan mark verification circuit for use in the system embodiment of FIG. 1.
FIG. 2B is a typical implementation of the Scan Mark Look Window Generator and the Scan Mark Width Detector of FIG. 2A.
Figure 2B:
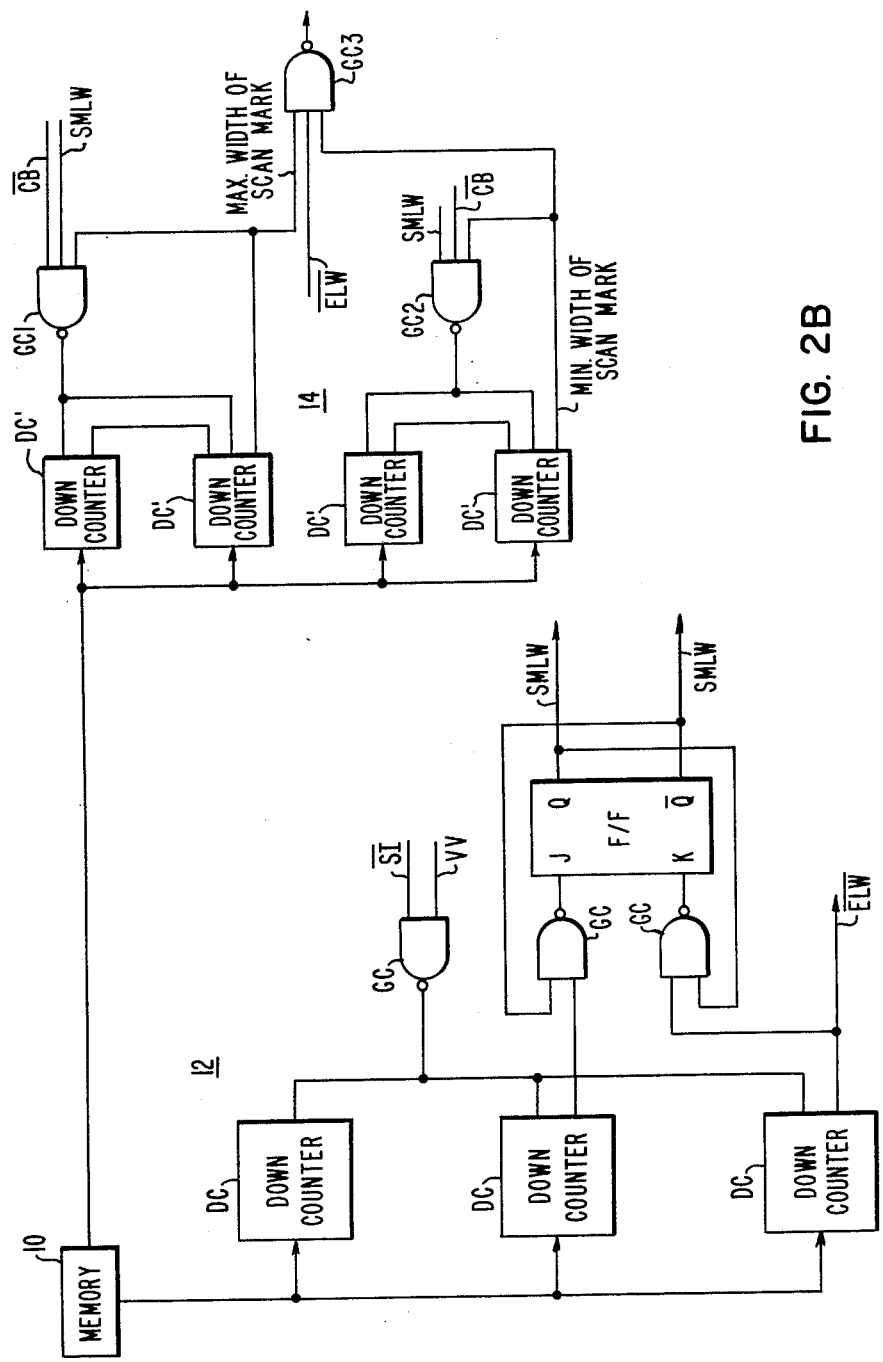
Figure 4:
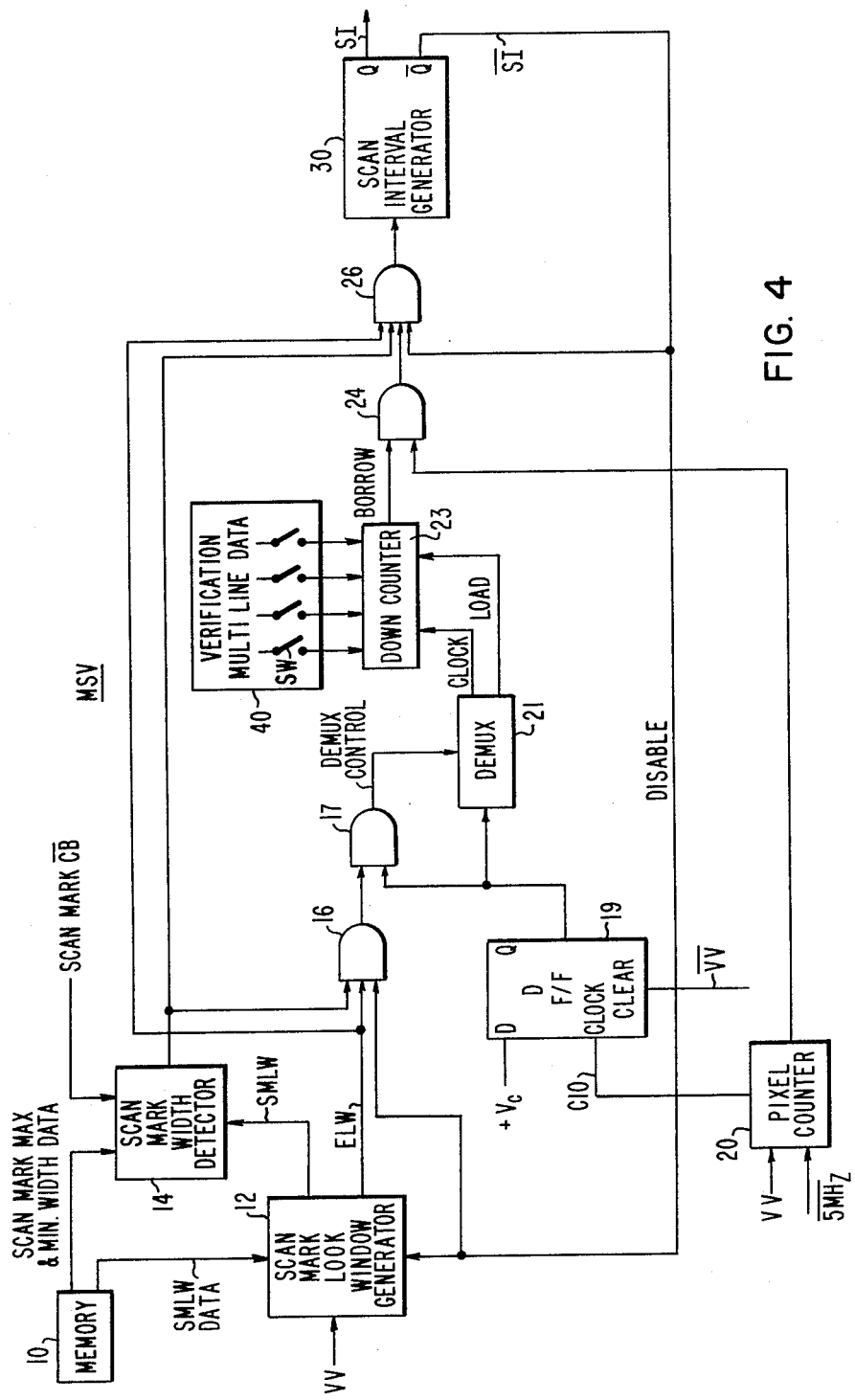
FIG. 4 is a schematic illustration of a multi-line verification circuit for use in the embodiment of FIG. 1.

While the circuitry of FIG. 2A and the corresponding timing diagram operations of FIGS. 3A and 3B depict a technique for implementing a two scan line verification of the scan mark, the technique can be readily extended to a multi-line, i.e. more than two, scan line verification of the presence of a scan mark SM. A suitable implementation of a multi-line scan mark verification circuit MSV is schematically illustrated in FIG. 4 with the corresponding timing diagram operation illustrated in FIG. 5. In the multi-scan line verification circuit MSV of FIG. 4 the operation of the memory 10, the scan mark look window generator 12, the scan mark width detector 14 and the logic AND gate 16 is comparable to that discussed with reference to the two line technique of FIG. 2A. Similarly, the logic AND gate 26 functions to control the operation of the scan interval generator 30 by activating the scan interval generator 30 in response to verification of the presence of a valid scan mark SM as described by a predetermined number of scan lines of the line scan camera. The scan interval generator 30 responds to the logic output of the AND gate 26 by generating output signals SI and $\overline{SI}$.

Prior to the presence of a scan mark signal CB the D-type flip-flop 19 responds to the input signal C10 from the pixel counter 20 by generating a train of pulses which, through the operation of a demultiplexer circuit 21 (Texas Instrument 74LS139), load the verification multi-line data from an input control source 40 into a down counter 23 (Texas Instrument 74LS169). The function of the source 40 may be implemented via a host computer or simply through the use of a set of manually operated switches SW. When the presence of the first line scan mark width and position has been verified by the scan mark width detector 14, the resulting logic output from AND gate 16 enables AND gate 17. Under this condition, the output from the D-type flip-flop 19 through the demultiplexer circuit 21, is used as the clock signal to the down counter circuit 23. Thus the demultiplexer control signal from the D-type flip-flop circuit 19 switches the signal path in the demultiplexer circuit 21.

Figure 5:
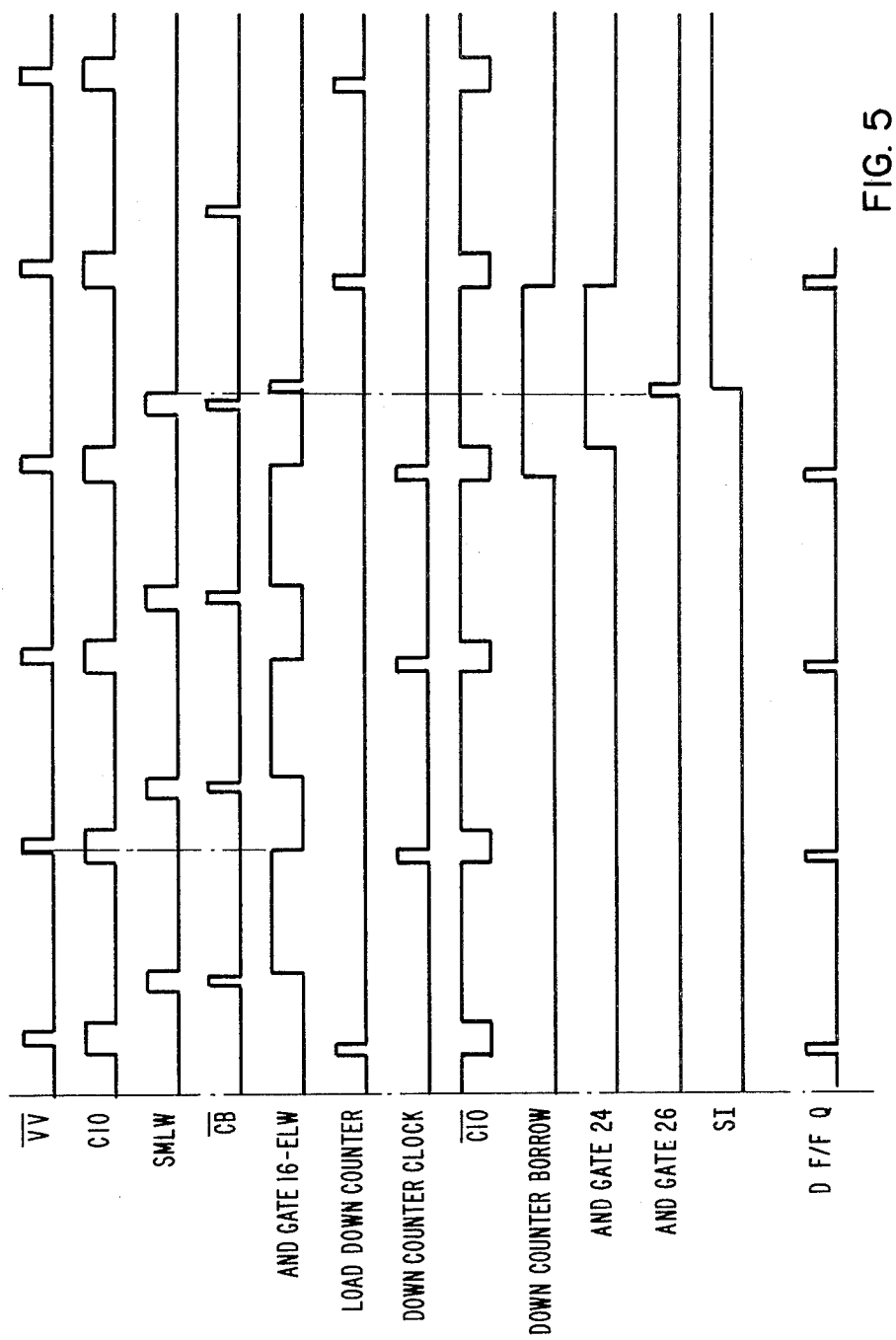
FIG. 5 is a timing waveform illustration of the operation of the multi-line verification circuit of FIG. 4.

The duration of the output waveform of the D-type flip-flop 19, as seen in FIG. 5, extends from the leading edge of the clock signal C10 to the leading edge of the signal $\overline{VV}$ which is well within the duration of the logic output of the AND gate 16. After a predetermined number of clock pulses, as determined by the preloaded verification multi-line data from the source 40, the down counter 43 reads zero resulting in an output signal from the down counter 23 to the logic AND gate 24. This input signal to the AND gate 24 is inhibited by the clock signal $\overline{C10}$ for the duration of the down time in order to avoid premature activation of the scan interval generator 30 by the logic AND gate 26. Once the inhibit clock signal $\overline{C10}$ is removed, the ELW signal from the scan mark look window generator 12 controls the timing of the logic AND gate 26 and the activation of the scan interval generator 30. As described above with reference to FIG. 2, once a scan interval signal SI is generated the verification process is terminated by the scan interval signal $\overline{SI}$ which disables the scan mark look window generator 12 and the logic AND gates 16 and 26. In the event there is no verification of a scan mark during successive scan lines a gap develops in the logic output of the AND gate 16 and the demultiplexer control signal output of the logic AND gate 17 switches the output signal of the D-type flip-flop circuit 19 to serve as the load signal of the down counter 23 which in turn resets the down counter 23 to its original state.

What I claim is:

1. In an optical scanning system including a line scan camera for scanning a document on a line-by-line basis and developing both a video valid output signal indicative of valid video information being viewed by the camera and an electrical output signal indicative of the document information from each scan line, said document including areas for accommodating data information and one or more pre-printed scan marks for establishing the location of the document and alerting the system information processing circuitry to the fact that data information areas of the document are about to be scanned, said system including memory means for generating scan mark location information identifying the scan mark location for a predetermined document format, the improvement for verifying the presence of a scan mark via two or more scan lines, said improvement comprising:

first circuit means responsive to said scan mark location information from said memory means for acknowledging a first scan line identification of a scan mark and developing an output signal indicative thereof, second circuit means responsive to said scan mark location information from said memory means for acknowledging a scan line identification of a scan mark and developing an output signal indicative thereof, and third circuit means responsive to the output signal of said first circuit means for inhibiting the operation of said second circuit means for a predetermined time duration following identification of said first scan line of the scan mark, the output signal generated by said second means following said predetermined time duration being a system scan mark verification signal for alerting said system information processing circuitry to the fact that a valid scan mark has been detected.

2. In an optical scanning system as claimed in claim 1 wherein said third circuit means includes counter means for inhibiting the operation of said second circuit means for a predetermined number of scan lines.

3. In an optical scanning system as claimed in claim 1 wherein said scan line camera includes a line array of photosensitive devices, said electrical output signal comprised of signal elements corresponding to the signal output of each of said photosensitive devices viewing a discrete picture element of said document during a scan line, said third circuit means including a counter means for inhibiting the operation of said second circuit means for a predetermined number of said picture elements.

* * * * *